United States Patent Office

3,798,265
Patented Mar. 19, 1974

3,798,265
POLYFLUOROALKOXY ALKYL AMIDOCAR-
BOXYLIC ACIDS AND SALTS THEREOF
Philip Lee Bartlett, Wilmington, Del., assignor to E. I. du
Pont de Nemours and Company, Wilmington, Del.
No Drawing. Filed Oct. 22, 1969, Ser. No. 868,597
Int. Cl. C07c *103/50*
U.S. Cl. 260—534 M                   8 Claims

ABSTRACT OF THE DISCLOSURE

Surfactant and emulsifying compounds derived from hexafluoropropylene oxide polymer acid halides and aminoacids having the formula:

$$R_fO[CF(CF_3)CF_2O]_nCF(CF_3)CON-R^2X$$
$$\quad\quad\quad\quad\quad\quad\quad\quad\quad\quad\quad\quad |$$
$$\quad\quad\quad\quad\quad\quad\quad\quad\quad\quad\quad\quad R^1$$

wherein $R_f$ is a perfluoroalkyl radical having from 1 to 6 carbon atoms, $n$ is an integer from 0 to about 8, $R^1$ is hydrogen or an alkyl radical having from 1 to about 12 carbon atoms, $R^2$ is an alkylene radical having from 1 to about 12 carbon atoms, arylene or a substituted alkylene radical having the formula $$-CH-(CH_2)_a-$$
$$\;\;\;|$$
$$(CH_2)_bR^3$$

wherein the sum of $a$ and $b$ is from 1 to about 12, and $R^3$ is OH, $SCH_3$ or $CO_2H$, $R^1$ and $R^2$ together may be an alkylene radical having 4 or 5 carbon atoms and X is $CO_2M$ or $SO_3M$ wherein M is hydrogen, alkali metal, ammonium or substituted ammonium.

BACKGROUND OF THE INVENTION

(1) Field of the invention

This invention relates to novel surfactant and emulsifying compounds and more particularly to compounds derived from hexafluoropropylene oxide polymer acid halides and aminoacids. Compounds of this invention function efficiently as surface active agents and may be used as emulsifying agents even in the formation of stable emulsions of polyfluorinated compounds and water.

(2) Description of the prior art

Hauptschein et al. in U.S. 3,238,235 disclose perfluoroalkylacid amide compounds having the formula:

$$C_nF_{2n+1}\overset{O}{\overset{\|}{C}}-N-R'-\overset{O}{\overset{\|}{C}}-OM$$
$$\quad\quad\quad\quad |$$
$$\quad\quad\quad\quad R$$

where $C_nF_{2n+1}$ is a perfluoroalkyl group which may have a straight or branched chain and which has a chain length of at least seven carbon atoms; where $n$ is an integer having a value ranging from 8 to 13; where R is hydrogen or an alkyl group (which may be straight or branched) having from 1 to 4 carbon atoms; where R' is an alkylene radical or a monohydroxy-alkylene radical (which may be straight or branched) having from 1 to 6 carbon atoms and where M is hydrogen, an alkali metal or ammonium. These compounds display surfactant properties which depend critically upon the number of carbon atoms in their perfluoroalkyl portion.

A surface active agent may be defined as any substance whose presence in small amounts markedly affects the surface behavior of a given system. A large number of surface active agents are characterized by molecular dimensions which are considerably longer than they are wide, i.e., they are long chain molecules. Usually, one end comprises a hydrocarbon radical which is characterized as hydrophobic with weak residual forces while the other end is hydrophilic with strong secondary valence forces. The hydrophilic end of the molecule is often ionic—characterized as being anionic or cationic depending upon the ionic group attached to the long chain molecule. The hydrophilic end of the molecule may however be nonionic—the hydrophilicity being attributed to nonionizable high affinity end groups usually containing a number of oxygen, nitrogen, or sulfur atoms in nonionizable configuration. Because of the bifunctional nature of the surface active molecules, many are useful as emulsifying agents. A satisfactory emulsifying agent is a material which by virtual of preferential solubility of each end of the molecule in each of the two immiscible phases reduces the surface tension of each of said phases so that an emulsion can result In the usual emulsion system consisting of oleaginous material and aqueous phase, most of the usual surface active agents (cationic, ionic, or nonionic) perform satisfactorily. However, when surface characteristics of polyfluorinated compounds need to be altered or when an emulsion of polyfluorinated compounds and water is desired, the above usual surface active agents, whether they be cationic, anionic, or nonionic, are not satisfactory. The principal reason for this unsatisfactory performance is that polyfluorinated compounds are generally both oleophobic and hydrophobic and neither end of the molecule of most surfactants is soluble in the polyfluorinated phase. This simultaneous oleophobic and hydrophobic nature of polyfluorinated compounds can thus be utilized very efficiently in the treatment of various substrates such as textiles, leather, cellulose, etc. to confer both oil and water repellency to such substrates.

Novel sulfonates and carboxylates have now been discovered which are efficient surfactants and which are useful as emulsifying agents even when a stable emulsion of a polyfluorinated compound and water is desired.

SUMMARY OF THE INVENTION

The present invention comprises compounds having the formula $$R_fO[CF(CF_3)CF_2O]_nCF(CF_3)CON-R^2X$$
$$\quad\quad\quad\quad\quad\quad\quad\quad\quad\quad\quad\quad |$$
$$\quad\quad\quad\quad\quad\quad\quad\quad\quad\quad\quad\quad R^1$$

wherein $R_f$ is a perfluoroalkyl radical having from 1 to 6 carbon atoms, $n$ is an integer from 0 to about 8, $R^1$ is hydrogen or an alkyl radical having from 1 to about 12 carbons atoms, $R^2$ is a straight or branched alkylene radical having from 1 to about 12 carbon atoms, arylene or a substituted alkylene radical having the formula $$-CH-(CH_2)_a-$$
$$\;\;\;|$$
$$(CH_2)_bR^3$$

wherein the sum of $a$ and $b$ is from 1 to about 12, and $R^3$ is OH, $SCH_3$ or $CO_2H$, $R^1$ and $R^2$ together may be an alkylene radical having 4 or 5 carbon atoms and X is $CO_2M$ or $SO_3M$ wherein M is hydrogen, alkali metal, ammonium or substituted ammonium.

DESCRIPTION OF THE INVENTION

The compounds of this invention are carboxylates and sulfonates derived from hexafluoropropylene oxide polymer acid halides and aminoacids and are represented by the above formula. For practical reasons such as ease of handling while making the compounds, economy, availability and ease of preparation the values of $R_f$, $n$, $R^1$, $R^2$ and $R^3$ have been thus limited. It is however, conceivable that these limits could be extended to produce additional useful carboxylates and sulfonates.

These compounds are useful as surface active agents an aqueous systems as will be seen in Example 3. While compounds, in which the value of $n$ is from 0 to 8, all effect marked lowering of surface tension of water, the compounds in which $n=1$ is preferred. When, however, the value of $n$ is increased, e.g., to $n=8$, the solubility in water of these compounds is so low that their effects on the surface tension of water cannot be measured above approximately 0.001%.

The compounds of this invention are also very effective emulsifying agents for polyfluorinated compounds and water due to the presence in each compound of hydrophilic groups as well as groups which are attractive to perfluorinated compounds. When an emulsion of polyfluorinated compound-in-water is desired, the compounds in which the value of $n$ is low, i.e., 3 or less are most useful, the compound in which $n=1$ being preferred. When, however, an emulsion of water-in-polyfluorinated compound is desired, the compounds in which the value of $n$ is greater than 4 are most useful, the compound in which $n=8$ being preferred. Yet another utility of the esters of this invention lies in their ability to modify the surface characteristics of water and oil in such a way that the aqueous phase will spread evenly on the surface of the oil. This property is of great importance in the use of water or foam formulations for fighting hydrocarbon fires since addition of proper amounts of esters of this invention to the water of foam formulation will allow them to spread in a filmlike fashion over the surface of the hydrocarbon thus eliminating exposure of the hydrocarbon to the air and preventing reignition of the fire. Because of the solubility advantages, compounds in which the values of $n$ are low are most useful in this application, the compounds in which the value of $n$ is from 0 to 2 being preferred.

The sulfonates and carboxylates of this invention are readily prepared by the reaction of hexafluoropropylene oxide oligomer acid halide with aminocarboxylic acid or aminosulfonic acid. Illustrative of this is the reaction of hexafluoropropylene oxide trimer acid fluoride with the aminoacid, glycine:

$CF_3CF_2CF_2O[CF(CF_3)CF_2O]CF(CF_3)COF$
$+H_2NCH_2COOH \rightarrow CF_3CF_2CF_2O[CF(CF_3)$
$CF_2O]CF(CF_3)CONHCH_2COOH + HF$ The reaction is preferably carried out in the presence of inert solvents such as diethyl ether, tetrahydrofuran, benzene, trichlorotrifluoroethane and the like. Hydrogen fluoride formed in the reaction may be removed by using the aminoacid in excess of that required for the reaction or by using an acid scavenger such as pyridine or triethylamine. The formation of polyfluoropolyoxaalkanamide may be carried out as described in MacKenzie U.S. 3,274,244.

The acid fluorides, $R_fO[CF(CF_3)CF_2O]_nCF(CF_3)COF$ utilized in the preparation of the compounds of this invention can be prepared by polymerizing hexafluoropropylene oxide alone or with a compound such as a carbonyl or acid fluoride in the presence of fluoride catalysts such as cesium fluoride. The nature of $R_f$ is determined by the appropriate choice of compounds polymerized with hexafluoropropylene oxide. Polymerization of hexafluoropropylene oxide alone gives fluoroalkyl ether acyl fluoride in which $R_f$ is $CF_3CF_2CF_2$; polymerization in the presence of $COF_2$ gives $R_f=CF_3$; polymerization in the presence of perfluoroaliphatic acyl fluoride, $C_aF_{2a+1}COF$, wherein $a$ is 1 to 6, gives $R_f=C_aF_{2a+1}CF_2-$. These preparations may be found in U.S. Pats. 2,250,808; 3,274,239; 3,419,610 and 3,322,826, and French Pats. 1,359,426 and 1,362,548.

The aminocarboxylic acids and aminosulfonic acids useful in the preparation of the compounds of present invention are known in the art and include glycine $H_2NCH_2COOH$ alanine, $H_2NCH(CH_3)COOH$; valine $H_2NCH(C_3H_7)COOH$ leucine $H_2NCH(C_4H_9)COOH$; methionine $H_2NCH(CH_2CH_2SCH_3)COOH$ aspartic acid, $H_2NCH(CH_2COOH)COOH$; glutamic acid $H_2NCH(CH_2CH_2COOH)COOH$; sarcosine $NHCH_3CH_2COOH$ serine $H_2NCH(CH_2OH)COOH$; $\beta$-alanine, $H_2NCH_2CH_2COOH$ 3-aminobutyric acid $H_2NCH_2CH_2CH_2COOH$; proline,

$\epsilon$-aminocaproic acid, $H_2N-(CH_2)_5-COOH$; N-n-dodecyl-$\beta$-alanine $C_{12}H_{25}NHCH_2CH_2COOH$; aminobenzoic acid, $H_2NC_6H_4COOH$; taurine $H_2NCH_2CH_2SO_3H$; methyltaurine $NHCH_3CH_2CH_2SO_3H$; aminomethanesulfonic acid $H_2NCH_2SO_3H$; aminopropanesulfonic acid $H_2N(CH_2)_3SO_3H$ and aminobenzenesulfonic acid $H_2NC_6H_4SO_3H$.

The alkali metal, ammonium or substituted ammonium salt of the carboxylic and sulfonic acid of present invention, is readily prepared by neutralization of said acids with appropriate base such as potassium hydroxide, sodium hydroxide, ammonium hydroxide, methyl amine, and dimethyl amine, in any manner known to those skilled in the art. By substituted ammonium is meant a cation represented by $NR^3_4$ wherein $R^3$ is selected from the group consisting of hydrogen, an alkyl radical having 1 to 4 carbon atoms and a hydroxyalkyl radical having 1 to 4 carbon atoms.

The following examples describe the invention in further detail. These examples are intended to be merely illustrative of the invention and not in limitation thereof. Unless otherwise indicated all parts are by weight.

EXAMPLE 1

Preparation of
$CF_3CF_2CF_2O[CF(CF_3)CF_2O]CF$
$(CF_3)CON(CH_3)CH_2COONH_4$

Sarcosine, $NHCH_3CH_2COOH$ (94.8 g.) and 1000 ml. of 1,1,2-trichloro-1,2,2-trifluoroethane were placed in a dry flask equipped with an agitator, a thermometer, a dropping funnel, a reflux condenser and a drying tube filled with anhydrous calcium chloride. The content of the flask was cooled to 10–15° C. Hexafluoropropylene oxide trimer acid fluoride $CF_3CF_2CF_2O[CF(CF_3)CF_2O]CF(CF_3)COF$ (265 g.) was slowly added through the dropping funnel over a period 30–40 minutes maintaining the temperature of the reaction at 10–15° C. After the completion of addition of acyl fluoride, the reaction mixture was then brought to the reflux temperature (48° C.) over a period of approximately one hour and the refluxing was maintained for 18 hours. After cooling to room temperature, the precipitated sarcosine hydrofluoride was removed by filtration. The trichlorotrifluoroethane solution of the amidoacid was washed three times with 500 ml. of distilled water. The trichlorotrifluoroethane solution was then dried over anhydrous sodium sulfate, filtered, and the amidoacid was isolated by removing the solvent, trichlorotrifluoroethane, by distillation at temperatures up to 50° C. and pressure of around 5 torr. The yield of the amidoacid was 298 g. (98.1%). Because of the hydroscopic nature of the amidoacid, it was converted to the ammonium salt by dissolving the above amidoacid in 1000 ml. of isopropanol, and then adding 30 g. of concentrated ammonium hydroxide solution (sp. gr. 0.90). The mixture was stirred for approximately 15 hours. The solvent was then removed by distillation at temperatures up to 50° C.

at a pressure of around 5 torr. The yield of the slightly yellow viscous oil product having the formula $$CF_3CF_2CF_2O[CF(CF_3)CF_2O]CF(CF_3)CON(CH_3)CH_2COONH_4$$

was 296 g. (94.5%) and had the following analyses: Percent F calc'd 55.3; percent F found 55.0. Percent N calc'd 4.8; percent N found 4.7.

EXAMPLE 2

Preparation of $$CF_3CF_2CF_2O[CF(CF_3)CF_2O]CF(CF_3)CONHCH_2CH_2SO_3NH_4$$

To a mixture of 2-aminoethanesulfonic acid, $$H_2NCH_2CH_2SO_3H$$

(25 g.), 50 ml. pyridine (acid acceptor) and 450 ml. 1,1,2-trichloro-1,2,2-trifluoroethane in a flask equipped as in Example 1, hexafluoropropylene oxide trimer acid fluoride, $$CF_3CF_2CF_2O[CF(CF_3)CF_2O]_{n=1}CF(CF_3)COF$$

(100 g.) was added slowly over a period of 30–40 minutes, maintaining the temperature of the reaction mixture at 10–15° C. After completion of addition of acyl fluoride, the reaction mixture was heated at reflux (48–50° C.) for a period of 20 hours. After cooling, pyridine hydrofluoride was removed by filtration. The solvent, trichlorotrifluoroethane, was removed by distillation at temperatures up to 50° C. and pressure of around 5 torr. The residue was then poured into approximately 500 ml. of cold water. To the water solution, 20 g. of concentrated sulfuric acid (sp. gr. 1.84) was slowly added. Sodium chloride (50 g.) was then added to the clear aqueous solution to separate acylated aminosulfonic acid as a viscous yellow liquid. Since the acylated aminosulfonic acid was hygroscopic, it was dissolved in 500 ml. of ethanol and 30 g. of concentrated ammonium hydroxide (sp. gr. 0.90) was added. The precipitated ammonium sulfate and a small amount of sodium chloride were removed by filtration. The solvent was then removed by distillation at temperatures up to 50° C. and a pressure of around 5 torr. to yield 123 g. (99.0%) of the product $$CF_3CF_2CF_2O[CF(CF_3)CF_2O]CF(CF_3)CONHCH_2CH_2SO_3NH_4$$

as a waxy yellow solid. Fluorine percent calculated 52.1; fluorine percent found 52.3; nitrogen percent calculated 4.5; nitrogen percent found 4.4.

The amidoacids of Example 1 and Example 2 may also be converted to alkali metal salts by substituting for the ammonium hydroxide, the appropriate alkali metal hydroxide. The amount of alkali metal hydroxide used should be equivalent to the amount of acid present.

Using the procedures described above, the following compounds were prepared:

TABLE I

| | | Analyses, percent | | | | Product, percent yield |
|---|---|---|---|---|---|---|
| | | Fluorine | | Nitrogen | | |
| | Compound ($R_f$=CF$_3$CF$_2$CF$_2$—) | Calculated | Found | Calculated | Found | |
| 1 | $R_fOCF(CF_3)CONHCH_2COONH_4$ | 51.7 | 51.6 | 6.9 | 6.8 | 95.6 |
| 2 | $R_fOCF(CF_3)CONHCHCOONH_4$ <br> $\quad\quad\quad\quad\quad\quad\quad\quad\quad$ CH$_3$ | 50.0 | 49.8 | 6.7 | 6.7 | 97.0 |
| 3 | $R_fOCF(CF_3)CONH$—⟨phenyl⟩—COONH$_4$ | 44.8 | 44.7 | 6.0 | 5.9 | 93.8 |
| 4 | $R_fOCF(CF_3)CONCH_2COONH_4$ <br> $\quad\quad\quad\quad\quad\quad\quad$ CH$_3$ | 50.0 | 49.7 | 6.7 | 6.7 | 97.0 |
| 5 | $R_fO[CF(CF_3)CF_2O]CF(CF_3)CONHCH_2COONH_4$ | 57.0 | 56.8 | 4.9 | 4.8 | 97.1 |
| 6 | $R_fO[CF(CF_3)CF_2O]CF(CF_3)CONHCH_2COOK$ | 54.7 | 54.6 | 2.4 | 2.3 | 97.7 |
| 7 | $R_fO[CF(CF_3)CF_2O]CF(CF_3)CONHCH_2COONa$ | 56.2 | 56.2 | 2.4 | 2.4 | 98.3 |
| 8 | $R_fO[CF(CF_3)CF_2O]CF(CF_3)CONCH_2COONa$ <br> $\quad\quad\quad\quad\quad\quad\quad\quad\quad\quad\quad\quad$ CH$_3$ | 54.9 | 54.8 | 2.4 | 2.3 | 97.8 |
| 9 | $R_fO[CF(CF_3)CF_2O]CF(CF_3)CONHCHCOONH_4$ <br> $\quad\quad\quad\quad\quad\quad\quad\quad\quad\quad\quad\quad\quad$ CH$_3$ | 55.3 | 55.2 | 4.8 | 4.7 | 98.0 |
| 10 | $R_fO[CF(CF_3)CF_2O]CF(CF_3)CONHCHCOONH_4$ <br> $\quad\quad\quad\quad\quad\quad\quad\quad\quad\quad\quad\quad\quad$ CH$_2$OH | 53.8 | 53.7 | 4.7 | 4.6 | 99.2 |
| 11 | $R_fO[CF(CF_3)CF_2O]CF(CF_3)CONH(CH_2)_5COONH_4$ | 51.6 | 51.4 | 4.5 | 4.6 | 97.3 |
| 12 | $R_fO[CF(CF_3)CF_2O]CF(CF_3)CONHCHCOOHN_4$ <br> $\quad\quad\quad\quad\quad\quad\quad\quad\quad\quad\quad\quad\quad$ CH$_2$CH$_2$SCH$_3$ | 50.2 | 50.0 | 4.4 | 4.3 | 96.7 |
| 13 | $R_fO[CF(CF_3)CF_2O]CF(CF_3)CONH$—⟨phenyl⟩—COONH$_4$ | 51.1 | 50.9 | 4.4 | 4.4 | 80.0 |
| 14 | $R_fO[CF(CF_3)CF_2O]CF(CF_3)CONHCHCOONH_4$ <br> $\quad\quad\quad\quad\quad\quad\quad\quad\quad\quad\quad\quad\quad$ CH$_2$CH$_2$COONH$_4$ | 49.1 | 48.8 | 6.4 | 6.3 | 96.0 |
| 15 | $R_fO[CF(CF_3)CF_2O]CF(CF_3)CONH$—⟨cyclopentyl⟩—COONH$_4$ | 52.9 | 52.8 | 4.6 | 4.6 | 95.7 |
| 16 | $R_fO[CF(CF_3)CF_2O]CF(CF_3)CON$—CH$_2$CH$_2$COONa <br> $\quad\quad\quad\quad\quad\quad\quad\quad\quad\quad\quad\quad$ C$_{12}$H$_{25}$ | 52.3 | 52.1 | 2.3 | 2.1 | 55.0 |
| 17 | $R_fO[CF(CF_3)CF_2O]CF(CF_3)CONCH_2COONH(CH_2CH_2OH)_3$ <br> $\quad\quad\quad\quad\quad\quad\quad\quad\quad\quad\quad\quad\quad$ CH$_3$ | 45.1 | 45.0 | 3.9 | 3.9 | 98.6 |

TABLE I—Continued

|  | Compound ($R_f = CF_3CF_2CF_2-$) | Fluorine Calculated | Fluorine Found | Nitrogen Calculated | Nitrogen Found | Product, percent yield |
|---|---|---|---|---|---|---|
| 18 | $R_fO[CF(CF_3)CF_2O]_2CF(CF_3)CON-CH_2CO_2NH_4$ with $CH_3$ | 58.3 | 58.1 | 3.7 | 3.6 | 93.0 |
| 19 | $R_fO[CF(CF_3)CF_2O]_8CF(CF_3)CONHCH_2COONH_4$ | 63.1 | 63.0 | 1.6 | 1.5 | 98.0 |
| 20 | $R_fO[CF(CF_3)CF_2O]_8CF(CF_3)CONH-\langle\text{phenyl-COOK}\rangle$ | 60.3 | 60.1 | 0.8 | 0.7 | 96.4 |
| 21 | $R_fOCFCF_3CONHCH_2CH_2SO_3NH_4$ | 46.0 | 45.9 | 6.2 | 6.1 | 98.3 |
| 22 | $R_fO[CF(CF_3)CF_2O]CF(CF_3)CONCH_2CH_2SO_3NH_4$ with $CH_3$ | 51.0 | 51.5 | 4.4 | 4.4 | 75.0 |
| 23 | $R_fO[CF(CF_3)CF_2O]_8CF(CF_3)CONHCH_2CH_2SO_3K$ | 60.7 | 60.5 | 0.8 | 0.8 | 96.3 |

EXAMPLE 3

Surface tension

The utility of the compounds of the present invention as surface active agents is clearly demonstrated by the data summarized in Table II below which shows measurements of surface tensions of the dilute aqueous solutions of these compounds at 25° C. using a Du Nouy tensionmeter. It is to be noted that even at a concentration as low as 0.001%, outstanding effectiveness in lowering the surface tension is shown. The measured surface tension of water at 25° C. was 71.9 dynes/cm.

In contrast to known compounds, it should also be noted that when surface tension values at 0.001% concentration are considered, the lowering of surface tensions is rather uniform in spite of the variation in the chain length of $CF_3CF_2CF_2O[CF(CF_3)CF_2O]_nCF(CF_3)-$ in the various examples.

of emulsifying polyfluorinated compounds and water giving either oil-in-water (O/W) emulsion or water-in-oil (W/O) emulsion. The second liquid phase in a water emulsion is always referred to as "oil" regardless of whether it is an oil or not. When the value of $n$ in $$CF_3CF_2CF_2O[CF(CF_3)CF_2O]_nCF(CF_3)-$$

is 3 or less ($n=1$ preferred), O/W type of emulsion is obtained with polyfluorinated compound whereas when the value of $n$ is greater than 4 ($n=8$ preferred), W/O type of emulsion is obtained with polyfluorinated compounds.

The following polyfluorinated compounds chosen as representative examples of liquid polyfluorinated compounds were emulsified: 1,1,2 - trichloro - 1,2,2-trifluoorethane (designated as A in the table); bis(trifluoromethyl)perfluorocyclobutane (designated as B in the table); and perfluoropropyl 1-H-perfluoroethyl ether (designated as C in the table).

TABLE II

|  | Compound ($R_f=CF_3CF_2CF_2-$) | 0.001 | 0.01 | 0.10 | 1.0 |
|---|---|---|---|---|---|
|  |  | Surface tension (dynes/cm.) | | | |
| 1 | $R_fOCF(CF_3)CONHCH_2COONH_4$ | 60.2 | 47.2 | 30.4 | 19.3 |
| 2 | $R_fOCF(CF_3)CONHCHCOONH_4$ with $CH_3$ | 57.3 | 43.4 | 28.2 | 18.1 |
| 3 | $R_fO[CF(CF_3)CF_2O]CF(CF_3)COHNCH_2COONH_4$ | 50.0 | 37.2 | 15.6 | 15.2 |
| 4 | $R_fO[CF(CF_3)CF_2O]CF(CF_3)CONHCH_2COOK$ | 49.0 | 36.4 | 15.1 | 14.9 |
| 5 | $R_fO[CF(CF_3)CF_2O]CF(CF_3)CONHCH_2COONa$ | 51.0 | 38.1 | 16.0 | 15.3 |
| 6 | $R_fOCF(CF_3)CF_2OCF(CF_3)CON(CH_3)CH_2COONH_4$ | 56.3 | 35.3 | 15.5 | 15.2 |
| 7 | $R_fO[CF(CF_3)CF_2O]CF(CF_3)CONH-\langle\text{cyclopentyl-COONH}_4\rangle$ | 54.3 | 32.3 | 15.0 | 14.9 |
| 8 | $R_fO[CF(CF_3)CF_2O]_8CF(CF_3)CONHCH_2COONH_4$ | 52.3 |  |  |  |
| 9 | $R_fO[CF(CF_3)CF_2O]CF(CF_3)CONHCHCOONH_4$ with $CH_3$ | 47.3 | 34.1 | 15.3 | 15.1 |
| 10 | $R_fOCFCF_3CONHCH_2CH_2SO_3NH_4$ | 57.3 | 42.7 | 20.1 | 15.3 |
| 11 | $R_fOCF(CF_3)CF_2OCF(CF_3)CONHCH_2CH_2SO_3NH_4$ | 59.5 | 46.1 | 21.5 | 15.2 |
| 12 | $R_fO[CF(CF_3)CF_2O]CF(CF_3)CONCH_2CH_2SO_3NH_4$ with $CH_3$ | 50.5 | 32.8 | 16.3 | 15.0 |
| 13 | $R_fO[CF(CF_3)CF_2O]_8CF(CF_3)CONHCH_2CH_2SO_3K$ | 53.4 |  |  |  |

Column header above concentrations: Compound concentration (gm./100 ml.)

EXAMPLE 4

Emulsion formation

The utility of the compounds of present invention as effective emulsifiers for polyfluorinated compounds and water is evident from the data shown in Table III and IV below. The compounds of present invention are capable When the compounds listed in Table III were shaken for two minutes with 5 ml. water and 95 ml. of polyfluorinated compounds at room temperature, white viscous O/W emulsions were obtained. These emulsions showed no evidence of phase separation when stored at room temperature for periods longer than five days.

TABLE III.—O/W EMULSIONS

| | | 5 ml. water, 95 ml. polyfluorinated compounds, room temperature | | |
|---|---|---|---|---|
| | Compound ($R_f=CF_3CF_2CF_2-$) | Conc. (g./100 ml.) | Polyfluorinated compound | Emulsion stability. |
| 1 | $R_fOC(CF_3)CF_2OCF(CF_3)CON(CH_3)CH_2COONH_4$ | 1.0<br>2.5 | A<br>A | Good.<br>Do. |
| 2 | $R_fOCF(CF_3)CF_2OCF(CF_3)CONHCH_2CH_2SO_3NH_4$ | 2.5 | B | Good. |
| 3 | $R_fO[CF(CF_3)CF_2O]CF(CF_3)CONCH_2COONH(CH_2CH_2OH)_3$<br>                                                            $\mid$<br>                                                          $CH_3$ | 3.0 | B | Do. |
| 4 | $R_fOCFCF_2CONHCH_2CH_2SO_3NH_4$ | 5.0 | A | Do. |

That the emulsions obtained above were of O/W type were demonstrated by (1) addition of water to above emulsions caused no separation of phases; (2) dilution with polyfluorinated compounds resulted in separation of phases.

When the compounds listed in Table IV were shaken for two minutes with 5 ml. of water and 95 ml. of polyfluorinated compounds at room temperature, opaque, very fluid W/O type of emulsion was obtained. These emulsions also showed no evidence of phase separation even after five days of storage at room temperature.

TABLE IV.—W/O EMULSIONS

| | | 5 ml. water, 95 ml. polyfluorinated compounds, room temperature | | |
|---|---|---|---|---|
| | Compound ($R_f=CF_3CF_2CF_2-$) | Conc. (g./100 ml.) | Polyfluorinated compound | Emulsion stability. |
| 1 | $R_fO[CF(CF_3)CF_2O]_3CF(CF_3)CONHCH_2COONH_4$ | 2.5 | A | Good. |
| 2 | $R_fO[CF(CF_3)CF_2O]_8CF(CF_3)CONHCH_2CH_2SO_3K$ | 2.5 | A | Do. |
| 3 | $R_fO[CF(CF_3)CF_2O]_8CF(CF_3)CONHCH_2CH_2SO_3K$ | 2.5 | B | Do. |
| 4 | $R_fO[CF(CF_3)CF_2O]_8CF(CF_3)CONHCH_2CH_2SO_3K$ | 2.5 | C | Do. |

That the emulsions obtained above were of W/O type was demonstrated by (1) addition of a small amount of water led to destruction of emulsions; (2) dilution with polyfluorinated compounds caused no separation of phases.

EXAMPLE 5

The utility of the compounds of present invention as surface active agents in a system containing polyfluorinated compounds is further demonstrated by their effective use in this example of polymerization of tetrafluoroethylene. In this reaction, in order to obtain polytetrafluoroethylene of desired high molecular weight, it is important that the surface active agent does not participate in the polymerization reaction as a chain transfer agent. In order to insure this, the $R^1$ value of the surfactant compound of the invention utilized in this example was an alkyl group and not hydrogen.

A horizontally disposed, water/steam jacketed, cylindrical stainless steel autoclave located in a barricade and having a capacity of 36,250 ml. and a length-to-diameter ratio of about 1.5 to 1, and provided with a 4-bladed cage-type agitator capable of being rotated at 46 r.p.m. and running the length of the autoclave, was charged with 855 g. of paraffin wax, 0.44 g. of electrolytically reduced iron powder, 100 g. of an aqueous solution containing 0.60 g. of methanol, and 135 g. of an aqueous solution prepared by dissolving 7.0 g. of compound of Example 1 in 21.5 kg. of demineralized water. The contents of the autoclave were then heated to 72° C., and the vessel was evacuated, after which 10.5 g. of disuccinic acid peroxide initiator slurried in 250 g. of cold demineralized water, was drawn in. The charge was then heated to a temperature of 80° C. with stirring and pressured over a period of about 2 minutes to 26.8 atmospheres absolute (380 p.s.i.g.) with tetrafluoroethylene. Stirring and temperature were maintained until "kick-off" occurred as evidence by an 80 p.s.i. (5.4 atm.) drop in pressure. The temperature was then raised to 90° C., and additional tetrafluoroethylene was added to raise the pressure to 28.2 atmospheres absolute (400 p.s.i.g.). This pressure was maintained for the duration of the polymerization reaction. After 1130 g. of tetrafluoroethylene had been fed after "kick-off," 465 g. of a 5.2% by weight aqueous solution of compound of Example 1 was injected into the autoclave at a rate of 55 g. per minute to stabilize the dispersion. The residual contents of the injection lines were flushed into the autoclave with 300 g. of demineralized water. After 10,200 g. of tetrafluoroethylene had been fed after "kick-off" the monomer feed to the autoclave was terminated, and the pressure was allowed to decrease to 12.9 atmospheres (75 p.s.i.g.) before agitation was stopped and the vapor space of the reactor was vented. The resulting dispersion was discharged and cooled after which the supernatant solid paraffin wax was removed.

A portion of the dispersion was diluted and coagulated by the procedure disclosed in U.S. 2,593,583. The average particle size (APS) of the particles in the uncoagulated dispersion was determined by light transmission measurement, according to the procedure described in U.S. 3,391,099. The Standard Specific Gravity (SSG) which is related inversely to the average molecular weight of the polymer, of the coagulated and dried polymer was measured by the procedure described in U.S. 3,142,665 except that 12 g., instead of 3.5 g., discs of the same diameter were employed. Using these procedures, the following values were determined:

Dispersed solids content (percent) _____ 34.5
APS (microns) _____ 0.22
SSG _____ 2.229

These data clearly show that effective polymerization of a polyfluorinated compound may be carried out when a compound of the present invention is utilized as the surface active agent in the polymerization system.

EXAMPLE 6

Aqueous film spreading on hydrocarbon surface

The compounds of the present invention in contrast to many surfactants allow a film of water or foam to spread uniformly on the surface of hydrocarbons. As discussed previously, this property is of great importance when these compounds are used in water or foam formulations employed in fighting hydrocarbon fires. The film spreading test of this example was carried out by placing 10 drops of a water solution of the surfactant compound on the surface of cyclohexane which was in a 125 mm. diameter evaporating dish and the time required for the aqueous film to completely cover the cyclohexane surface was recorded. The results of this test are shown in Table V below.

TABLE V.—AQUEOUS FILM SPREADING ON CYCLOHEXANE SURFACE

| | Compound ($R_f$=$CF_3CF_2CF_2$—) | Percent by wt. | Film spreading (sec.) |
|---|---|---|---|
| 1 | $R_fOCF(CF_3)CF_2OCF(CF_3)CON(CH_3)CH_2COONH_4$ | 0.1<br>1.0 | 60<br>1 |
| 2 | $R_fO[CF(CF_3)CF_2O]CF(CF_3)CONCH_2CH_2SO_3NH_4$<br>$\|$<br>$CH_3$ | 0.1<br>1.0 | 40<br>1 |
| 3 | $R_fOCF(CF_3)CONCH_2COONH_4$<br>$\|$<br>$CH_3$ | 0.1<br>1.0<br>2.0 | (¹)<br>(¹)<br>10 |
| 4 | $R_fO[CF(CF_3)CF_2O]_2CF(CF_3)CON-CH_2CO_2NH_4$<br>$\|$<br>$CH_3$ | 0.1 | 10 |
| 5 | $R_fO[CF(CF_3)CF_2O]CF(CF_3)CON-CH_2CH_2COONa$<br>$\|$<br>$C_{12}H_{25}$ | 0.1<br>1.0 | (¹)<br>60 |
| 6 | $CF_3CF(CF_3)-(CF_2)_5CON(CH_3)CH_2COONH_4$ | 0.1<br>1.0<br>2.0 | (¹)<br>(¹)<br>(¹) |

¹ Does not spread.

Compound 1 above, $$CF_3CF_2CF_2OCF(CF_3)CF_2OCF(CF_3)CON(CH_3)CH_2COONH_4$$

is similar to the prior art compound $$CF_3CF(CF_3)-CF_2-CF_2-CF_2-CF_2-CF_2-CON(CF_3)CH_2COONH_4$$

with respect to chain length in the acyl portion of the molecule (8 atoms vs. 7 atoms), and the amide portions of the molecules are identical. The data above show clearly that Compound 1 of this invention is very effective in film spreading while the comparable compound of prior art is not at all effective even at a concentration of 2%.

While the present invention is illustrated in terms of compounds having a perfluoroalkyl radical designation for $R_f$, it is quite conceivable that the hexafluoropropylene oxide polymerization could take place in the presence of a perfluoroaromatic acyl fluoride such as $C_6F_5COF$ and that the resultant $R_f$, i.e., $C_6F_5CF_2$— could be utilized in the same manner as a perfluoroalkyl radical in the production of an equally effective compound. This could also be true if the polymerization took place in the presence of a perfluoroketone giving $$R_f=(R_f')_2CF-$$

or in the presence of perfluoroalkoxide or phenoxide giving $$R_f=(R_f')_3C- \text{ and } R_f=C_6F_5$$

respectively.

The foregoing detailed description has been given for clarity of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A compound having the formula $$CF_3-CF_2-CF_2O[CF(CF_3)CF_2O]_nCF(CF_3)CO\overset{R^1}{N}R^2COOM$$

wherein $n$ is an integer from 0 to 8, $R^1$ is hydrogen or an alkyl radical having from 1 to 12 carbon atoms, $R^2$ is an alkylene radical having 1 or 2 carbon atoms or a straight chain alkylene radical having 5 carbon atoms, and M is hydrogen, alkali metal, ammonium or a tri(hydroxyalkyl)amine radical having from 1 to 4 carbon atoms.

2. A compound according to claim 1 wherein $n$ is 1.

3. A compound according to claim 1 wherein $R^1$ is $CH_3$—.

4. A compound according to claim 1 wherein $R^1$ is H—.

5. A compound according to claim 1 wherein $R^2$ is $CH_2$—.

6. A compound according to claim 1 wherein $R^2$ is $CH_2CH_2$—.

7. A compound according to claim 1 wherein M is $NH_4$.

8. A compound according to claim 1 having the formula:

$$CF_3CF_2CF_2O[CF(CF_3)CF_2O]CF(CF_3)CON(CH_3)CH_2COONH_4$$

References Cited

UNITED STATES PATENTS

| 2,764,603 | 9/1956 | Ahlbrecht | 260—404.5 |
| 3,238,235 | 3/1966 | Hauptschein et al. | 260—404 |
| 3,250,808 | 5/1966 | Moore et al. | 260—535 H |
| 3,644,513 | 2/1972 | Sweeney et al. | 260—534 E |

JAMES A. PATTEN, Primary Examiner

J. F. TERAPANE, Assistant Examiner

U.S. Cl. X.R.

117—139.5, 142, 154; 252—6.5, 355, 357; 260—29.1, 92.1, 326.3, 404, 501.11, 509, 513 N, 514 J, 519, 534 C, 534 G, 544 F